July 5, 1960  H. P. BISHOP  2,943,698
CYCLONE-TYPE SEPARATOR
Filed March 10, 1958
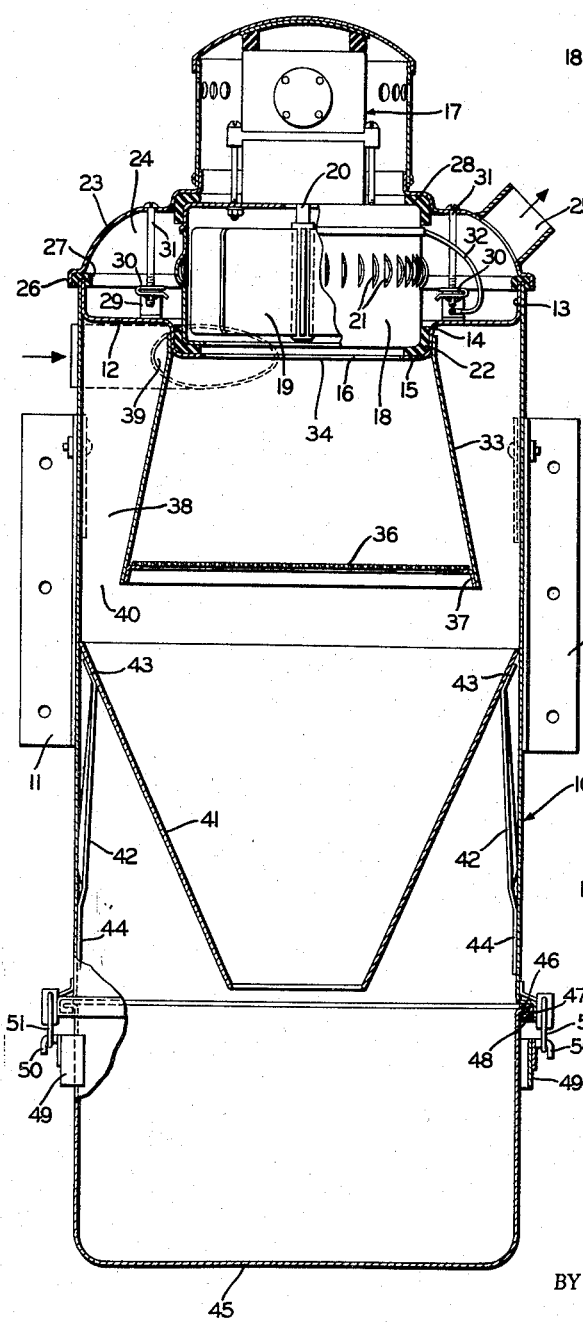
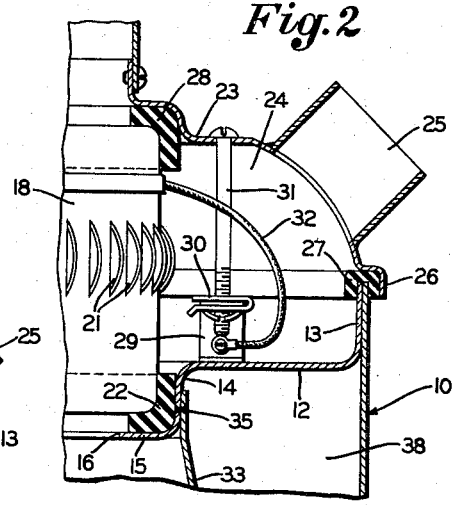
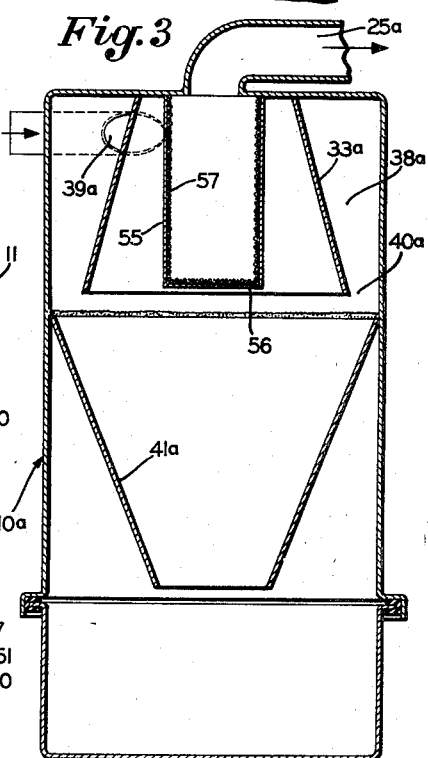
INVENTOR
*Harold P. Bishop*
BY *Frease & Bishop*
ATTORNEYS United States Patent Office 2,943,698
Patented July 5, 1960

2,943,698
CYCLONE-TYPE SEPARATOR
Harold P. Bishop, 510 W. Broad St., Louisville, Ohio
Filed Mar. 10, 1958, Ser. No. 720,145
2 Claims. (Cl. 183—37)

The invention relates to suction-operated means for separating dust and dirt and other finely divided materials from air, and more particularly to a cyclone-type separator for a central vacuum system.

Under present practice, separators of this type comprise generally a vertical cylindrical casing having a suction fan in the upper end thereof. A straight cylindrical cyclone tube extends downwardly into the casing from the inlet to the fan.

A straight tubular passage is thus provided between the exterior of the cyclone tube and the inner wall of the casing, and an air inlet communicates tangentially with the interior of the casing at the upper end of this passage. Air is exhausted from the fan through an air outlet or exhaust in the top of the casing.

Below the cyclone tube a downwardly tapered cone is located within the casing, and a pan is located below the cone for collecting dust, dirt or other finely divided material separated from the air.

In the operation of separators of this type, the dust-laden air passes from the tangential air inlet downwardly and circumferentially through the straight tubular passage between the exterior of the cyclone tube and the inner wall of the casing, and then upward through the cyclone tube and through the fan to the air exhaust outlet.

Theoretically, the dust and dirt are separated from the air as it emerges from the lower end of this passage between the cyclone tube and the casing, and dropped by gravity through the cone to the dust-collecting pan.

However, in actual practice, it frequently happens that a portion of the dust is carried upward with the air through the cyclone tube to the fan and exhausted therefrom. Applicant has discovered that this difficulty may be overcome by restricting the lower end of the air passage between the cyclone tube and the casing wall.

The downwardly and circumferentially moving dust-laden air will thus be squeezed as it moves downwardly in the passage and will be squirted downwardly out of the restricted lower end of the air passage, tending to force all of the dust and dirt down through the cone to the dust-collecting pan.

It is therefore a primary object of the invention to provide a cyclone-type dust separator which overcomes the above-mentioned difficulty in present practice.

Another object of the invention is to provide a separator of this character in which the tubular air passage between the cyclone tube and the inner wall of the casing is downwardly tapered.

A further object is to provide such a cyclone-type separator in which the cyclone tube is downwardly flared from the fan inlet to the lower screened end of the tube.

It is also an object of the invention to provide a novel mounting for the motor and fan assembly which assures an air-tight seal.

The above and other objects, apparent from the drawing and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawing.

In general terms the invention may be briefly described as comprising an upright casing or canister having a cyclone tube located in its upper portion, the cylone tube and the upper portion of the casing being so shaped that they provide a downwardly tapered air passage therebetween.

An air inlet communicates tangentially with the upper portion of this passage and air is exhausted through the upper end of the cyclone tube. Below the cyclone tube, the conventional downwardly tapered cone is located in the casing to discharge dust and dirt into a dust-collector pan located therebelow.

The separator may also include an annular fan and motor support plate at the upper end of the casing, a fan and motor assembly mounted upon said plate with a gasket interposed therebetween, a dome extending from the upper end of the casing or canister to the top of the fan with gaskets between the dome and the canister and between the dome and fan; Tinnerman-type saddles connected to the upper surface of the support plate and having Tinnerman-type nuts mounted thereon, and bolts located through the top of the dome and engaging said nuts.

The cyclone tube may be downwardly flared, and communicates at its upper end with the inlet to the fan and may be provided at its lower end with a screen. This downwardly flared cyclone tube, together with the inner wall of the cylindrical casing, provides a downwardly tapered air passage having a restricted lower end.

An air inlet communicates tangentially with the upper portion of this passage and the fan exhausts into the dome which is provided with an air exhaust outlet. The usual downwardly tapered cone is located within the casing below the cyclone tube and a dust and dirt-collector pan is located below the cone.

In the operation of the improved cyclone-type separator, dust-laden air is drawn into the upper end of the tubular and downwardly tapered passage between the downwardly flared cyclone tube and the inner wall of the casing and travels circumferentially around and downward in the passage.

The cyclonic moving dust-laden air is squeezed as it moves downward in this passage and is squirted downwardly out of the restricted lower end of the air passage with considerable force in the same manner as water is discharged through the nozzle of a hose.

The dust and dirt are thus discharged downwardly through the cone with considerable force and are thus effectively separated from the air which then passes up through the cyclone tube and through the fan.

In the accompanying drawing,

Fig. 1 is a vertical longitudinal sectional view through a cyclone-type separator embodying the invention;

Fig. 2 is an enlarged fragmentary sectional view of the improved fan and motor assembly mounting and seals therefor; and Fig. 3 is a vertical section of a simple form of the invention.

Referring now more particularly to the construction illustrated in Figs. 1 and 2 of the drawing, in which similar numerals refer to similar parts throughout, the improved cyclone-type separator to which the invention pertains is mounted within a vertical cylindrical casing or canister indicated generally at 10.

For the purpose of mounting the separator upon a wall or other vertical support, brackets 11 may be provided. An annular mounting plate 12 is located in the upper portion of the casing having the upturned peripheral flange 13 received within and spot-welded to the upper end of the casing or canister 10.

At a point spaced inwardly from the periphery, the supporting plate is provided with the annular shoulder 14 and terminates in the inwardly disposed annular flange 15, the central portion of the support plate being cut out as at 16 providing access to the inlet of the fan as will be later described.

The motor and fan assembly comprises the motor indicated generally at 17 mounted upon the top of the fan housing indicated at 18. As shown in the drawing, the fan housing is of somewhat larger diameter than the motor for a purpose to be later explained.

A suction fan 19 is mounted upon the shaft 20 of the motor and adapted to draw air upward through the fan housing 18 and exhaust it peripherally therefrom as at 21. An annular lower fan seal gasket 22 is interposed between the lower end of the fan housing 18 and the annular offset plate 14—15 of the support plate 12.

A dome 23 is mounted between the upper end of the casing 10 and the upper end of the fan casing 18 and provides an exhaust chamber 24 sealed from the interior of the canister, and provided with an air exhaust outlet 25 through which air exhausted from the fan may be discharged.

The lower end of the dome 23 is provided with the offset annular flange 26 which receives the canister and dome gasket 27. The top fan seal gasket 28 is interposed between the upper end of the fan housing 18 and the overhanging upper end of the dome 23.

A plurality of Tinnerman-type saddles 29 are welded or otherwise attached at their lower ends to the support plate 12 and a Tinnerman-type nut 30 is carried by each saddle and engaged by a bolt 31 located through the upper portion of the dome 23. With this construction the dome is drawn tightly down upon the sealing gaskets 22, 27 and 28 and clamps the fan housing 18 upon the sealing gasket 22, thus providing air-tight seals between the dome, the canister and the fan housing.

The motor 17 may be provided with any conventional electric circuit for operating the same and the motor may be grounded as by the ground wire 32 connected to the fan housing 18 and to one of the saddles 29.

As the motor operates, the fan has a tendency to pull the motor down. With the construction of seals and motor mounting disclosed and above described, it will be seen that this will tend to tighten the seal between the dome 23 and the casing or canister 10, through compression of the gasket 27.

This construction makes it possible to make an airtight seal assembly between the canister 10 and the motor support plate 12 at the gasket 27, without the necessity of continuous welding, brazing or otherwise sealing at this point.

The principal feature of the invention is the downwardly tapered tubular air passage around the cyclone tube 33 which extends downwardly into the casing 10 from the fan inlet 34. The upper end of the cyclone tube 33 is shown as fitting around the offset shoulder 14 of the support plate 12 and may be spot-welded or otherwise attached thereto as at 35.

The cyclone tube 33 is flared downwardly and outwardly toward its lower end which may be covered by a wire mesh screen 36, mounted within the lower end of the cyclone tube as by the retaining ring 37. A downwardly tapered tubular air passage 38 is thus formed between the exterior of the flared cyclone tube 33 and the inner wall of the casing or canister 10.

Dust-laden air is admitted to the upper end of this downwardly tapered tubular passage 38 through the tangential air inlet 39, from which the air will move circumferentially and downwardly through the passage 38 to the restricted lower end 40 thereof.

A downwardly tapered hollow cone 41 is located within the casing 10 a short distance below the lower end of the cyclone tube 33 and is shown as supported within the casing by the cone support brackets 42 connected at their upper ends to the upper portion of the cone as at 43 and at their lower ends to the inner wall of the casing as shown at 44.

The cone 41 extends to a point spaced from the lower end of the casing 10. A dirt and dust-collector pan 45 is connected to the lower end of the casing 10 and is shown as having the out-turned peripheral flange 46 at its upper open end located within the annular shoulder 47 at the lower end of the casing, a gasket 48 being interposed therebetween.

For the purpose of detachably mounting the dust-collector pan 45 upon the lower open end of the casing, clamp brackets 49 provided with hooks 50, may be attached to the peripheral portion of the pan 45 for engagement by any suitable clamp hinges, as indicated at 51, for clamping the pan upon the casing and compressing the sealing gasket therebetween.

In the operation of the improved cyclone-type separator, dust-laden air will be drawn through the inlet 39 tangentially into the downwardly tapered annular passage 38 and will be rigidly moved circumferentially and downwardly in said passage.

The air will be squeezed as it is moved downward in the passage 38 and will be squirted or discharged from the restricted lower end 40 of the passage with considerable force. This will cause the dirt and dust in the air to be ejected downwardly into the cone 41 causing it to rapidly and effectively separate from the air and to drop into the pan 45, while the air from which the dust and dirt is thus being separated, will then pass upward through screen 36 and through the cyclone tube 33, being drawn into the fan casing 18 through the inlet 34 thereof, and then discharged from the fan casing and through the air exhaust outlet 25 of the dome.

In Fig. 3 is shown a simplified form of the invention in which the upper end of the casing 10a may be centrally connected to an exhaust pipe 25a leading to any suitable suction means. This obviates the necessity of locating the fan and motor assembly of Fig. 1 within the casing.

The cyclone tube 33a communicates at its upper end with the exhaust pipe 25a, and may be downwardly flared as shown, providing the downwardly tapered tubular air passage 38a, with restricted lower end 40a, is between the cyclone tube and the casing 10a.

It will be understood that the reason for flaring the cyclone tube downwardly is to provide the downwardly tapered air passage between the cyclone tube and the upper portion of the cylindrical casing. It will also be seen that this downwardly tapered air passage may be formed by downwardly tapering the upper portion of the casing, while the cyclone tube may be a straight cylindrical tube as in conventional practice.

Dust-laden air may be admitted to the upper end of the downwardly tapered tubular air passage 38a through the tangential air inlet 39a, the air being exhausted through the exhaust pipe 25a, while the dust and dirt are ejected downwardly through the cone 41a to the dust-collector pan 45a in the manner described above with reference to Fig. 1.

Separators constructed with the downwardly tapered tubular air passage as above disclosed, will remove between 98 and 99 percent of the dust from the air, as compared with about 96 percent of dust removed by the conventional cyclone type separator.

In order to increase the efficiency of the separator, a filter may be located within the cyclone tube as shown in Fig. 3. This filter may be formed of suitable filter material such as filter paper or fabric, and is in the form of a cylinder as indicated at 55 having closed lower end 56, the open upper end communicating with the suction outlet from the cyclone tube.

This paper or fabric filter 55 has a substantially rigid frame therein to prevent collapse of the paper or fabric. As shown in the drawing, this frame may be in the form of a cylindrical wire mesh or perforate screen 57.

Such a filter provided within the cyclone tube of a separator embodying the invention will assist in removing substantially all of the dust from the air. Although, for purpose of illustration, the filter is shown only in Fig. 3, it should be understood that it may be used to equal advantage in the embodiment of Fig. 1, in which case the screen 36 may be omitted.

It is also pointed out that this filter may be used to advantage in the conventional cyclone-type separator provided with conventional straight cylindrical cyclone tube.

From the above it will be obvious that the downwardly flared cyclone tube, forming the downwardly tapered tubular air passage with restricted lower end, provides a distinct advantage over present practice in which a straight cylindrical cyclone tube is used.

With the improved construction it is not necessary to depend on gravity alone to separate the dust and dirt from the air and the separating is much more complete than with the present practice.

It will also be seen that a simple and efficient means is provided for mounting the motor and fan assembly and for providing for air-tight seals between the casing and the dome and the motor and fan assembly. It will also be seen that this mounting provides a substantially smooth interior with nothing to obstruct free flow of the air.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:
1. A cyclone-type separator comprising a vertical cylindrical casing, an annular support plate in the upper end of the casing, a downwardly offset annular support flange depending from the inner perimeter of the annular support plate, a suction fan mounted upon said annular support flange, said fan having an inlet opening at its lower side and having peripheral outlets, a dome connected to the top of the cylindrical casing and enclosing the fan, an exhaust outlet on the dome, a downwardly flared cyclone tube spaced inwardly from the cylindrical casing and connected at its upper end to said annular support flange, the open upper end of the cyclone tube communicating directly with the inlet opening of the fan, said cyclone tube and the adjacent portion of said cylindrical casing forming therebetween a downwardly tapered tubular air passage with a restricted lower end, a downwardly tapered hollow cone within the cylindrical casing and connected at its upper end to the inner walls of the casing directly below said cyclone tube, a dust collector directly below said hollow cone, and a tangentially located air inlet in the upper end of said tubular air passage.

2. A cyclone-type separator comprising a vertical cylindrical casing, an annular support plate in the upper end of the casing, a downwardly offset annular support flange depending from the inner perimeter of the annular support plate, a suction fan mounted upon said annular support flange, said fan having an inlet opening at its lower side and having peripheral outlets, a dome connected to the top of the cylindrical casing and enclosing the fan, an exhaust outlet on the dome, a downwardly flared cyclone tube spaced inwardly from the cylindrical casing and connected at its upper end to said annular support flange, the open upper end of the cyclone tube communicating directly with the inlet opening of the fan, a wire mesh screen at the lower end of said cyclone tube, said cyclone tube and the adjacent portion of said cylindrical casing forming therebetween a downwardly tapered tubular air passage with a restricted lower end, a downwardly tapered hollow cone within the cylindrical casing and connected at its upper end to the inner walls of the casing directly below said cyclone tube, a dust collector directly below said hollow cone, and a tangentially located air inlet in the upper end of said tubular air passage.

References Cited in the file of this patent
UNITED STATES PATENTS

| | | |
|---|---|---|
| 619,912 | Sutcliffe | Feb. 21, 1899 |
| 1,464,741 | Bennett | Aug. 14, 1923 |
| 1,978,802 | Lissman | Oct. 30, 1934 |
| 2,015,464 | Saint-Jacques | Sept. 24, 1935 |
| 2,087,789 | Allardice | July 20, 1937 |
| 2,516,707 | Lewyt et al. | July 25, 1950 |
| 2,627,936 | Martinet | Feb. 10, 1953 |
| 2,656,897 | Yonkers | Oct. 27, 1953 |

FOREIGN PATENTS

| | | |
|---|---|---|
| 528,606 | Great Britain | Nov. 1, 1940 |
| 875,253 | Germany | Apr. 30, 1953 |
| 917,046 | Germany | Aug. 23, 1954 |